(No Model.)

W. W. MALLERY.
MILK COOLER.

No. 414,561. Patented Nov. 5, 1889.

Witnesses

Inventor
William W. Mallery.
By his Attorneys

UNITED STATES PATENT OFFICE.

WILLIAM W. MALLERY, OF HOLLAND PATENT, NEW YORK.

MILK-COOLER.

SPECIFICATION forming part of Letters Patent No. 414,561, dated November 5, 1889.

Application filed May 29, 1889. Serial No. 312,488. (No model.)

*To all whom it may concern:*

Be it known that I, WILLIAM W. MALLERY, a citizen of the United States, residing at Holland Patent, in the county of Oneida and State of New York, have invented certain new and useful Improvements in Milk Cans, Coolers, and Strainers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a milk can, cooler, and strainer, and has for its object the provision of a can for receiving and transporting the milk in, and to combine therewith devices whereby the milk is thoroughly strained and deprived of its animal heat.

The improvement consists of the novel features which will be hereinafter more particularly described and claimed, and which are shown in the annexed drawings, in which—

Figure 1:
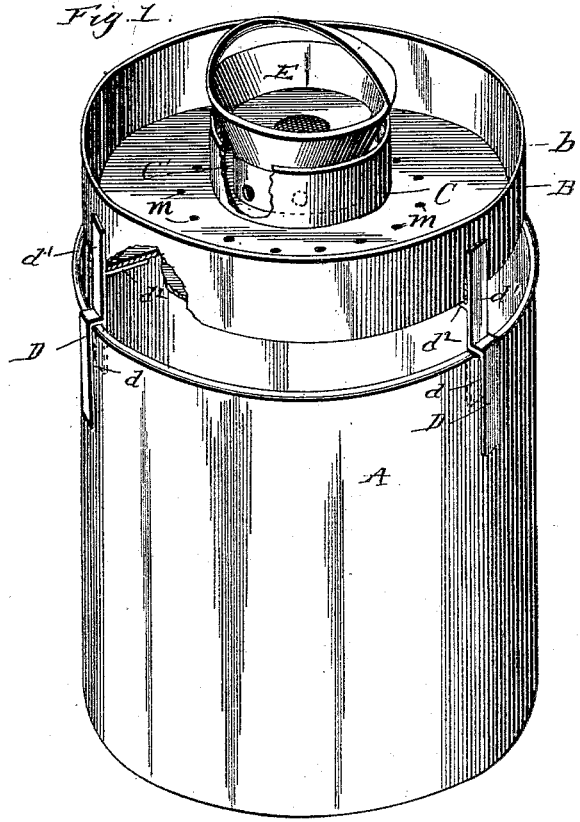
Figure 2:
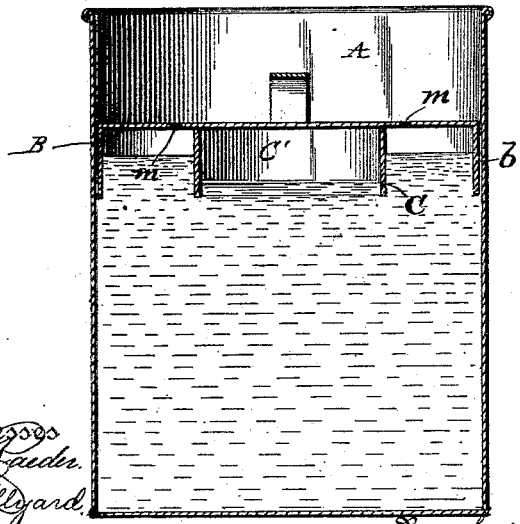
Figure 3:
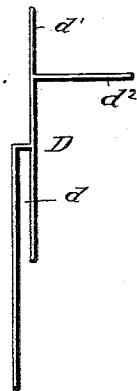

Figure 1 is a perspective view, parts being broken away, of a milk-can embodying my invention; Fig. 2, a vertical section showing the position of the cover when transporting the milk; Fig. 3, a detail view of the removable brackets.

The can A is of ordinary shape and size, and the cover B, which is adapted to enter the can, has a wide depending rim $b$ and an inner rim C, the latter forming an air-chamber of sufficient capacity to float the cover on the milk. The cover between the two rims $b$ and C is perforated at $m$ to allow the heat and gases to escape from the milk, and to permit the escape of the milk from the cover to the can when the cover is placed in position and used as a support for the strainer, as shown in Fig. 1. The brackets D are each composed of a clip $d$, that sets astraddle of the edge of the can, a vertical extension $d'$, and a lateral arm $d^2$.

For storing or transporting the milk the cover is placed within the can, as shown in Fig. 2, being supported by the air in the chamber C'. When straining the milk, the brackets are arranged around the edge of the can at proper intervals, and the cover is reversed and placed on the arms $d^2$ of the brackets, and the strainer E, which is of ordinary construction, is set in the chamber C'. The milk being poured in the strainer passes through the same and fills the chamber C', and, flowing over the rim C, escapes into the space between the two rims $b$ and C. From this space the milk passes through the said openings $m$ in the cover and escapes into the can. The milk being strained the cover and brackets are removed, the brackets being used over again. The milk passing over the rim C in a thin sheet and escaping from the cover in fine streams is thoroughly aerated and cooled, as will be readily understood.

Having thus described my invention, what I claim, and desire to secure by Letters Patent, is—

1. The hereinbefore-described milk-can cover and strainer-support, composed of the cover B, having the concentric rims $b$ and C, the rim C being closed by the milk and forming an air-chamber to float the cover when the latter is inserted in the can, and the rim $b$ adapted to guide the cover in its movements in the can and prevent the spilling of the milk when straining, said cover B having openings $m$ opposite the space between the two rims to permit the escape of the gases and the passage of the strained milk into the can, substantially as set forth.

2. The combination, with the can and the cover, of the independent brackets removably set astraddle of the edge of the can and having vertical extensions $d$ to embrace the sides of the cover and lateral arms $d^2$ to extend beneath and support the said cover, substantially as described.

In testimony whereof I affix my signature in presence of two witnesses.

WILLIAM W. MALLERY.

Witnesses:
HERMAN OWENS,
JOHN E. JONES.